United States Patent [19]
Greer et al.

[11] Patent Number: 5,987,466
[45] Date of Patent: Nov. 16, 1999

[54] PRESENTING WEB PAGES WITH DISCRETE, BROWSER-CONTROLLED COMPLEXITY LEVELS

[75] Inventors: Timothy Dan Greer, Endicott; William Francis Phillips, Owego, both of N.Y.

[73] Assignee: International Business Machines Corporation, Armonk, N.Y.

[21] Appl. No.: 08/978,305

[22] Filed: Nov. 25, 1997

[51] Int. Cl.⁶ .................................................. G06F 17/30
[52] U.S. Cl. .................................. 707/10; 707/1; 707/4; 707/101; 707/104; 707/201; 707/501; 707/513
[58] Field of Search ........................... 707/1, 4, 10, 101, 707/104, 201, 501, 513

[56] References Cited

U.S. PATENT DOCUMENTS

| | | | |
|---|---|---|---|
| 5,572,643 | 11/1996 | Judson | 395/793 |
| 5,659,729 | 8/1997 | Nielsen | 707/3 |
| 5,701,451 | 12/1997 | Rogers et al. | 707/1 |
| 5,721,908 | 2/1998 | Lagarde et al. | 707/10 |
| 5,724,595 | 3/1998 | Gentner | 395/762 |
| 5,727,950 | 3/1998 | Cook et al. | 434/350 |
| 5,737,619 | 4/1998 | Judson | 395/761 |
| 5,737,739 | 4/1998 | Shirley et al. | 707/512 |
| 5,752,022 | 5/1998 | Chiu et al. | 707/10 |
| 5,752,246 | 5/1998 | Rogers et al. | 707/10 |
| 5,778,372 | 7/1998 | Cordell et al. | 707/100 |
| 5,787,254 | 7/1998 | Maddalozzo, Jr. et al. | 395/200.58 |
| 5,790,793 | 8/1998 | Higley | 395/200.48 |
| 5,793,964 | 8/1998 | Rogers et al. | 395/200.32 |
| 5,802,299 | 9/1998 | Loigan et al. | 707/513 |
| 5,809,247 | 9/1998 | Richardson et al. | 395/200.48 |
| 5,826,242 | 10/1998 | Montulli | 705/27 |
| 5,870,544 | 2/1999 | Curtis | 395/187.01 |
| 5,870,552 | 2/1999 | Dozier et al. | 707/501 |

OTHER PUBLICATIONS

"Netscape Navigator Handbook", Netscape Communications Corporation, 1996, URL http://www.netscape.com/eng/mozilla/3.0/handbook/.

Kindlund, E., "Navigating the applet–browser divide", IEEE Software, Sep.–Oct. 1997 pp. 22–25.

Newsome, M., "HyperSQL: web–based query interfaces for biological databases", Proceedings of the Thirtieth Hwaii International Conference on System Sciences, 1997. Jan. 7–10, 1997 pp. 329–339 vol. 4.

Puliafita, A., "Increasing application accessibility through Java", IEEE Internet Computing Jul.–Aug. 1998 vol. 2, Issue: 4 pp. 70–77.

*Primary Examiner*—Wayne Amsbury
*Assistant Examiner*—Shahid Alam
*Attorney, Agent, or Firm*—John R. Pivnichny

[57] ABSTRACT

A method of browsing the Worldwide Web of the Internet and presenting elements of a web page to a user. The web browser requests a desired HTML and then requests other elements of the page based upon user defined priority levels. Elements are presented to the user in priority sequence as soon as received eliminating unnecessary waiting for lower priority or unrequested elements, as well as partial display of desired elements.

12 Claims, 4 Drawing Sheets

PRESENTING WEB PAGES WITH DISCRETE, BROWSER-CONTROLLED COMPLEXITY LEVELS

TECHNICAL FIELD

This invention relates generally to web browsers and deals more particularly with a web browser with the capability of presenting user selected types of elements of a requested web page.

BACKGROUND OF THE PRESENT INVENTION

The world wide web (WWW) comprises a multitude of computer servers, respective databases which are managed by servers and contain documents formatted as web pages, and a network by which clients can communicate with the servers and thereby request and load web pages of interest. Clients and servers utilize the Hypertext Transfer Protocol (http), a known application protocol to communicate and provide access to information by using a standard page description language known as Hypertext Markup Language (HTML). The information can comprise text, graphics, applets, images, sound, animated video etc. Each of the clients includes a "web browser" which is an interface to the user and the WWW. One common web browser is the Netscape Navigator (TM) web browser licensed by Netscape Communications Corporation of Mountain View, Calif. The Netscape Navigator web browser is further described in "Hands on Netscape" David Sacks, Prentice Hall, Upper Saddle River, N.J., 1996 ISBN013240284X.

Each web page is specified by a Uniform Resource Locator (URL) address which comprises an access method/protocol designation such as http as a prefix, a server name, and the requested document as a suffix. The server name typically includes a "domain name" which may be the name of a company, educational institution, government body, or other organization that maintains the server. The request indicates a web page associated with the server. There are different ways that a client can obtain a web page. If the client knows the URL, the client can directly request the web page from the server. However, if the client only knows the server name, the client can address the server name and in response, the server will present the "home page" for the server. The home page (and other web pages) typically includes tags or "hot links" which reference other associated web pages. When the user selects a hot link, the web browser requests the respective web page from the corresponding server.

There has been explosive growth in the network of computers known as the WWW. This expansion, while advantageous for information exchange, has led to problems of congestion, slowing or even preventing traffic. Furthermore, developments in browser technology have led to more useful but more complex download formats including interactive and dynamic presentations which typically require more time to be received and to be processed by a browser. Consequently a user typically first sees a fragment, typically text, of the web page on the display screen. Other elements of the page such as video, applets etc. are received, processed, and gradually filled in as they are fetched. Meanwhile, the web page is unusable and confusing. This waiting wastes the user's time and causes dissatisfaction with the WWW.

U.S. Pat. No. 5,572,643 fills in the waiting time by displaying different types of informational messages, for example, advertisements, notices, messages, copyright information, and the like. Such diversionary activity is resented by many users and does not address the problem described above.

Some browsers such as Netscape Navigator browser with its Autoload Images option provide an option to turn off graphics. While this feature may offer some performance improvement when loading web pages with extensive graphics content, it provides no help to the user who does not want or need video, sound, or JAVA applets. Other users may want graphics only and, having read the text during a previous view of the page, have no need or desire for text. The ability to turn off graphics provides no help to such users.

OBJECTS OF THE INVENTION

A general object of the present invention is to expedite the availability of web page information desired by a user.

SUMMARY

The present invention resides in a client computer for presenting user selected types of elements of a web page. The client computer receives a user selection of types of elements of a web page that the user desires the client computer to present. Next the client computer receives user selection of a web page. Then in response to this user selection of a web page the client computer requests an HTML for the web page from a server. When the HTML is received, the client computer displays text defined by the HTML if text is one of the element types selected by the user. The client computer also loads from a server and displays other element types referenced by the HTML and selected by the user.

DETAILED DESCRIPTION OF THE PREFERRED EMBODIMENT

Figure 1:
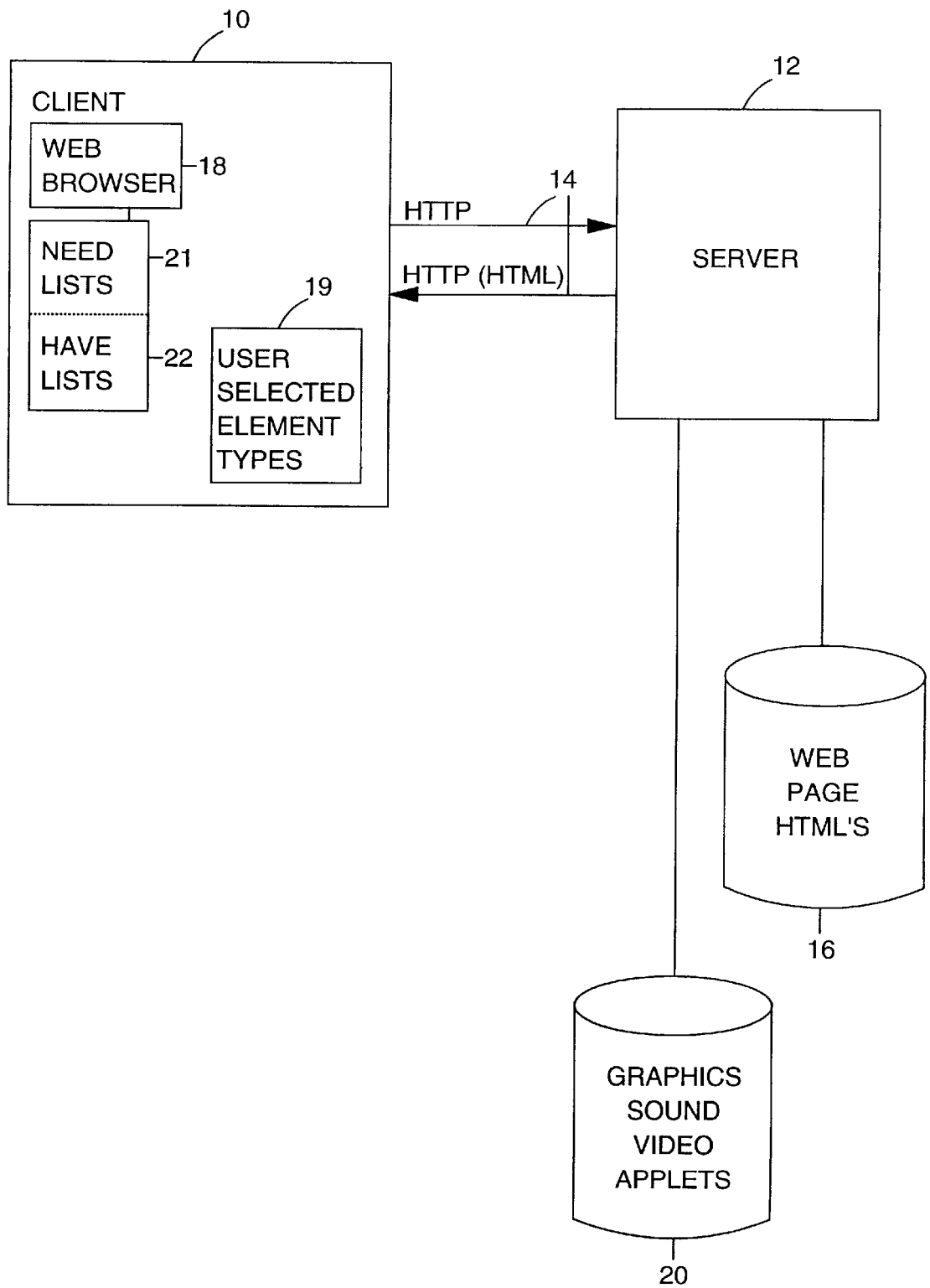
FIG. 1 is a block diagram of a client computer, a server and networking communication lines on the WWW in accordance with one embodiment of the present invention.

Referring now to the drawings in detail wherein like reference numbers indicate like elements throughout, FIG. 1 illustrates a client 10, server 12, and network communication lines 14 according to one embodiment of the present invention. There can be other, "intermediary" servers (not shown) between client 10 and server 12. Server 12 manages a data base 16 of web page HTML's. Other data bases 20 of graphics, sound, video and applets files may be managed by the same or a different server. Data bases 16 and 20 are stored on DASD or other storage media either as separate DASD drives as shown, or may be combined into a single larger storage media. Files in data base 20 are not in HTML format but may be referenced in one or more HTML files in data base 16. In the illustrated example, web browser 18 communicates with the server 12 using the http access method. The server can return an HTML for a web page imbedded in the http communication.

The HTML usually contains the actual text, indications of the nature of the elements on the web page, and pointers to the other elements, e.g. audio, graphics, applets, video etc. A web page designer may include in the HTML an alternate text to be displayed in place of an element type which the user has not selected. An alternate access method, file transport protocol, (FTP) could be used to access these other elements. The industry standard format of the HTML's is further described in "HTML for Fun and Profit" by Mary E. S. Morris, published in 1995 by Sun Soft Press, a Prentice Hall title. As explained in more detail below with respect to FIGS. 3 and 4, the user advises the web browser as to which element types the user would like to view. These user selections are recorded in file 19. When web browser 18 subsequently reads an HTML, the web browser records in a Needlist 21 which of the elements contained in or referenced by the HTML correspond to the element types recorded in file 19. As it reads the HTML, the web browser proceeds to fetch the elements listed in the Needlist 21 using http or other access methods and, as elements arrive, records their receipt in a Havelist 22.

Figure 3:
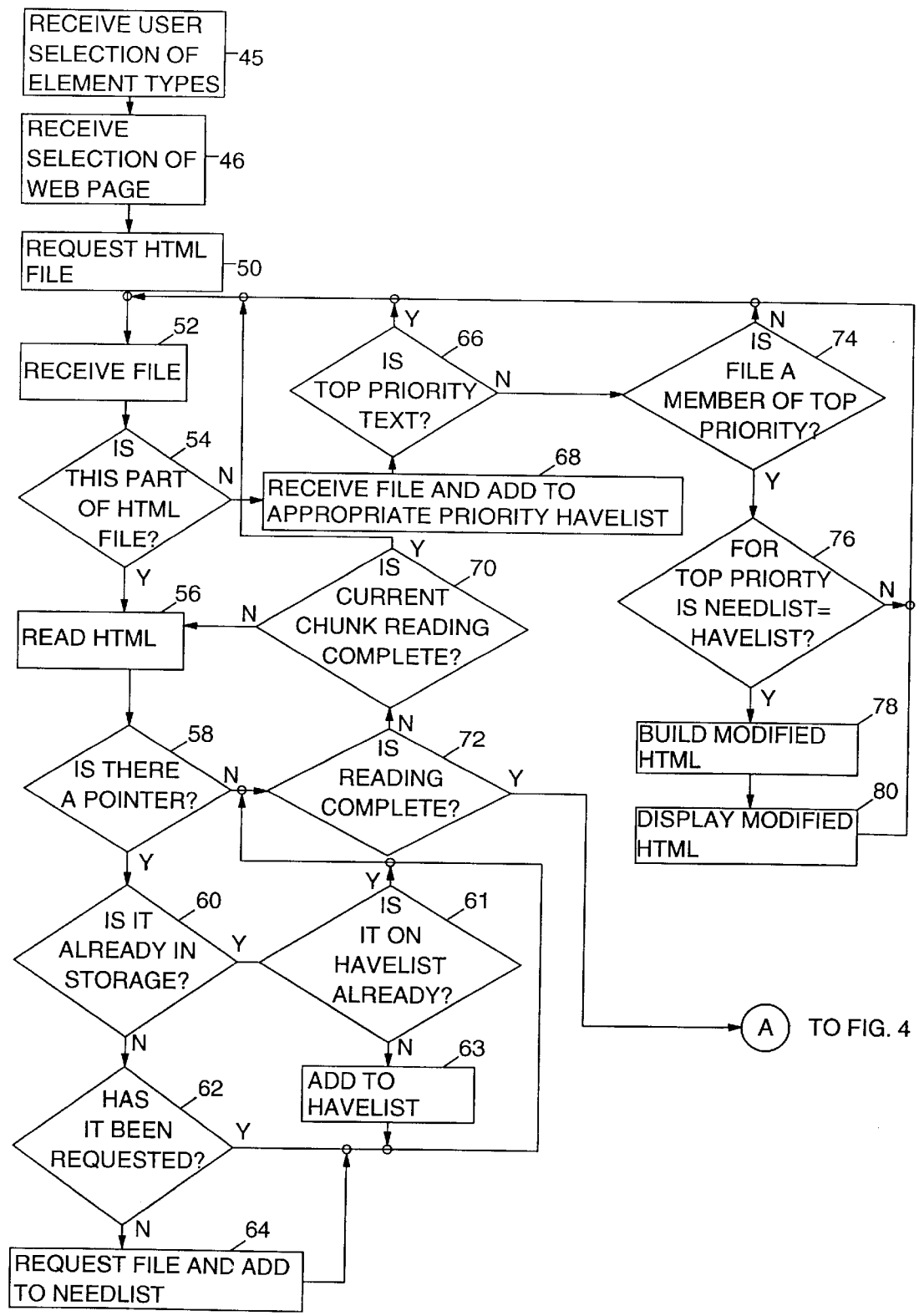
FIGS. 3 and 4 form a flowchart illustrating a web browser in the client computer of FIG. 1.

The operation of the client computer according to the present invention is illustrated in FIG. 3. A user defines for each priority level a specific set of element types desired and other element types not desired (step 45). This definition can be considered a single or top priority level. The present invention is not limited to one priority level and, in fact, multiple sets of elements can be specified and assigned various priorities as will be explained later.

A web browser 18 stores into file 19 the user selection of element types. Later the user selects a web page (step 46). The selection can be made by the user specifying a URL or by selecting a link on another web page. In the latter case, web browser 18 converts the link selection to a URL. Once the URL is known, web browser 18 requests the HTML from server 12 (step 50). The file arrives in "chunks" or packets over networking communication lines 14 (step 52). In step 54, the browser determines whether each file packet is part of the requested HTML by, for example, examining the file header. If so, the HTML file, or part of the HTML file, is read in step 56 to determine whether there is a pointer i.e. for graphics, applets, audio, etc. to another element of the web page which has been selected in step 45. If not, step 58 proceeds to step 72. Otherwise, the browser in step 60 determines whether the element referenced by the pointer is already in storage at client 10 (decision 60) and, if so, proceeds to step 61. If not, the browser determines whether the element has been requested (decision 62), for example, by a previous pass through this part of the flowchart, and if not, requests the element and adds the pointer to the Needlist. Decision 61 determines whether the file in storage is already listed on the Havelist. If not, it is added in step 63. There are separate Needlists for each priority level, but for this explanation, assume a single priority level and a single Needlist.

In step 72, the browser determines whether the entire HTML has been read (e.g. in step 56) and, if so, proceeds to step 82. If not, the browser determines whether the current chunk of the HTML has been completely read (decision 70). For example, there may be more than one pointer in the current chunk requiring additional passes through step 58. If the current chunk has been completely read, the browser loops back to step 52 to get any additional chunks of HTML.

Referring again to step 54, if the received file is not part of the requested HTML, then it is one of the elements referenced by a pointer requested in step 64 and is received in step 68. The browser also adds this pointer to the Havelist in step 68. In an alternate embodiment, if the file is not needed for the highest priority, the web browser holds off requesting the file in step 64 until all the files needed for the highest priorty are displayed. In step 66, the browser determines whether text was defined as an element of top priority and, if so, loops back to step 52. If not, and the received file is an element type defined as top priority, as noted in step 74, then the browser determines whether all elements of top priority have been received by comparing the Havelist with the Needlist in step 76 and, if so, proceeds to build a modified HTML in step 78. The modified HTML includes a "placeholder" graphic or text at the position of the web page where the undesired element(s) would normally appear. Then browser 18 displays the modified HTML in step 80 and returns to step 52 to process other priorities. By way of example, the placeholder graphic is an alternate text and the placeholder text is a generic text icon.

Although the description above assumes a single or top priority, the flowchart of FIG. 3 also describes how multiple priorities can be handled. Respective Needlists (steps 64 and 76) and Havelists (steps 68 and 76) are maintained for each defined priority level (with no other modification required to FIG. 3). The detailed description of FIG. 4. will assume such multiple lists have been maintained if multiple priorities have been defined by the user.

Figure 4:
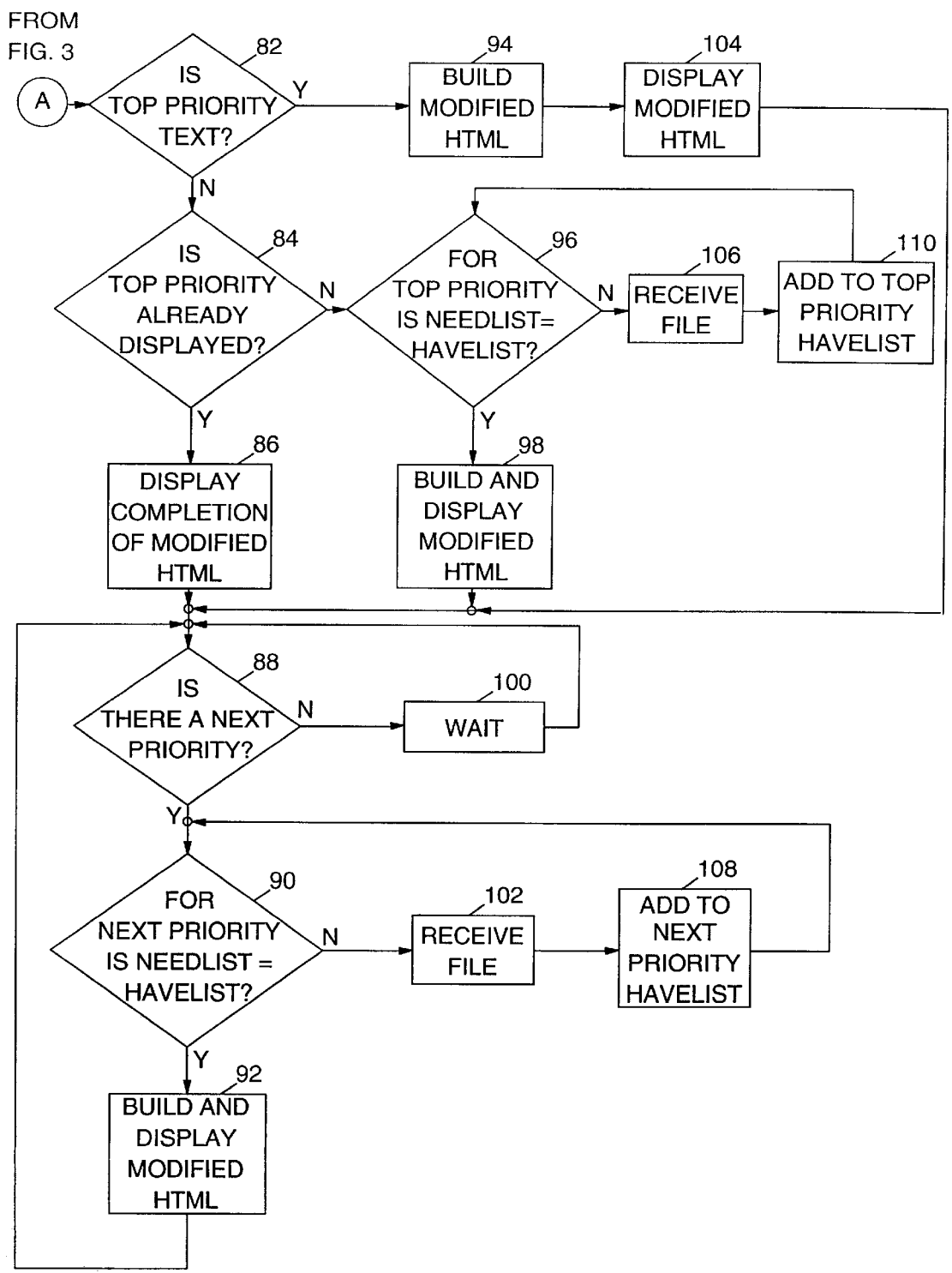

After reading of the HTML is complete in step 72 of FIG. 3, the browser determines in step 82 of FIG. 4 whether text is defined as top priority and, if so, builds the modified HTML in step 94 and displays it in step 104. In the case that text is not defined as the top priority, the browser determines in step 84 whether the defined top priority elements are already displayed. If so, then the browser displays the completion of the modified HTML in step 86.

For the situation where the top priority is not already displayed, the browser in step 96 determines whether all elements for top priority have been received and, if so, builds and displays the modified HTML for top priority in step 98. If not, the browser receives the file in step 106 and adds it to the top priority Havelist in step 110 and then re-checks whether all elements (for top priority) have been received in step 96.

For simplicity of explanation, file receiving steps 68, 102, and 106 are each shown as a single step. Those skilled in the art will recognize that the files can be received in packets or chunks without detracting from the explanation of FIGS. 3 and 4.

Regardless of whether the top priority gets displayed in step 86, 98, or 104, the browser then proceeds to process the next priority, if any, in step 88. If not, the browser stops and waits in step 100 until the user either requests another web page—restarting the process in step 50 of FIG. 3—or defines an additional priority level. Where there is another priority level, the browser performs steps 90, 102, 108 and 92 for that priority level in a manner comparable to steps 96, 106, 110 and 98 just described for the top priority level. The browser then loops back to step 88 to check for a further priority level.

As an alternative in step 92 the browser can suspend displaying the next priority level until the user selects (clicks on) a "next" button located, for example, on the periphery of the display screen.

Another implementation of the invention include a "group" tag which a page designer can include in the HTML to force grouping of page elements. The user can then define one or more groups in the priority definitions. The elements of a group would then not be shown to a user until all of the elements of that group were received whether of the same element type or not.

From the description above, those skilled in the art will recognize that the invention provides the desired benefit of delivering the requested web page elements to the user as soon as the data is available without waiting for unrequested parts to arrive. The user is able to see the requested page elements in the priority order he or she has selected. Furthermore, partial displays which can be confusing are readily avoided.

Figure 2:
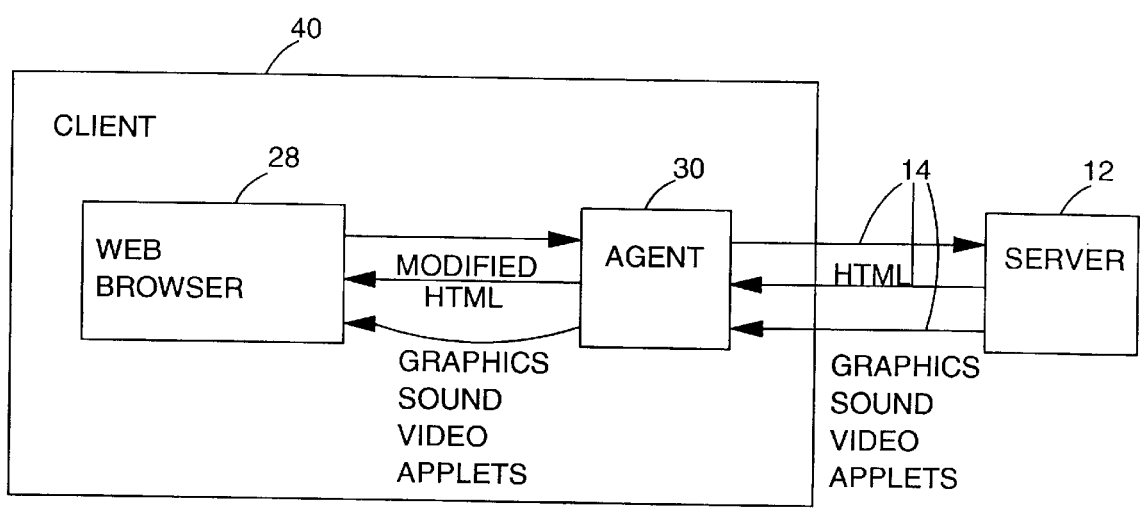
FIG. 2 is a block diagram of a client computer, a server, and network communication lines in accordance with another embodiment of the present invention.

Although the invention has been described in terms of the preferred embodiment, those skilled in the art will recognize that various modifications of the invention can be practiced within the spirit and scope of the appended claims. For example, some of those steps described as performed by the web browser can also be performed by the agent 30 of FIG. 2 which operates in conjunction with a current state-of-art web browser 28. Client 40 using web browser 28 instructs agent 30 to request a web page HTML stored on server 12. Agent 30 makes the request using the http protocol described above and subsequently receives the requested HTML over networking communication lines 14. Agent 30 processes the received HTML, making requests for other elements referenced by pointers in the HTML and passes modified HTML and other elements to web browser 28 for display to client 40. In this embodiment agent 30 keeps Needlists and Havelists according to the flowchart of FIGS. 3 and 4. It is also envisioned that some or all of the elements of a web page can be conveyed to the user aurally (by a speaker set, for example) or by tactile or olfactory means as well as on a display screen.

Moreover, although the HTML and other elements are envisioned as located on a remote server, it is also possible that some or all of these may have been loaded into a storage cache during a previous request during this or a previous session without departing from the spirit of the invention. Likewise, the networking communication lines as implemented can be broadly construed to include any method known in the art for transferring data to and from a server including telephone wires, coaxial or fiber cable, radio waves, infrared radiation or the like.

What is claimed is:

1. A client computer for presenting user selected types of elements of a web page, said client computer comprising:

means for receiving user selection of one or more types of elements of a web page that said user desires the client computer to present, said types comprising applets, video data and audio data;

means for receiving user selection of a web page;

means, responsive to said user selection of a web page, for requesting an HTML for said web page from a server;

means for loading from said server and displaying said one or more types of elements referenced by said HTML and selected by said user, and not loading or displaying another of said types of elements not selected by said user.

2. A client computer as set forth is claim 1 wherein:

said loading and displaying means comprises a web browser.

3. A client computer as set forth in claim 1 wherein:

said loading and displaying means comprises an agent operating with a web browser.

4. A client computer as set forth in claim 1, further comprising:

means for receiving a plurality of user defined priority levels of element types; and means for loading from said server and displaying said element types in the order of said priority levels.

5. A client computer as set forth in claim 4, further comprising:

means, responsive to user indication, for displaying said element types of a next highest or a previous priority level.

6. A client computer as set forth in claim 1, further comprising:

means for receiving from said server, one or more group tags, each associated with a web page element; and means, responsive to user definition, for withholding display of any elements of a group until all such elements of said group have been received.

7. A method for presenting user selected types of elements of a web page, said method comprising the steps of:

receiving user selection of types of elements of a web page that user desires to be presented, said types of elements comprising applets, video data, and audio data;

receiving user selection of a web page;

in response to said user selection of a web page, requesting an HTML for said web page from a server;

loading from said server and displaying said one or more types of elements referenced by said HTML and selected by said user, and not loading or displaying another of said types of elements not selected by said user.

8. A method as set forth in claim 7 wherein:

said loading and displaying step comprises loading and displaying with a web browser.

9. A method as set forth in claim 7 wherein:

said loading and displaying step comprises loading and displaying with an agent operating with a web browser.

10. A method as set forth in claim 7, further comprising the steps of:

receiving a plurality of user defined priority levels of element types; and loading from said server and displaying said element types in the order of said priority levels.

11. A method as set forth in claim 10, further comprising the step of:

in response to user indication, displaying said element types of a next highest or a previous priority level.

12. A method as set forth in claim 7, further comprising the steps of:

receiving one or more group tags, each associated with one or more web page elements; and in response to user definition, withholding display of any elements of a group until all such elements of said group have been received.

* * * * *